(12) United States Patent
Reif et al.

(10) Patent No.: US 9,776,147 B2
(45) Date of Patent: Oct. 3, 2017

(54) DEVICE AND METHOD FOR ADJUSTING STIRRING BLADES

(71) Applicant: Sartorius Stedim Biotech GmbH, Goettingen (DE)

(72) Inventors: Oscar-Werner Reif, Hannover (DE); Gerhard Greller, Goettingen (DE); Ute Husemann, Goettingen (DE); Thomas Dreher, Goettingen (DE); Oliver Scheibe, Stadthagen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 182 days.

(21) Appl. No.: 14/876,293

(22) Filed: Oct. 6, 2015

(65) Prior Publication Data
US 2016/0023172 A1 Jan. 28, 2016

Related U.S. Application Data

(63) Continuation of application No. PCT/EP2014/000491, filed on Feb. 25, 2014.

(30) Foreign Application Priority Data

Apr. 9, 2013 (DE) .......................... 10 2013 103 526

(51) Int. Cl.
*B01F 7/00* (2006.01)
*B01F 7/06* (2006.01)
(Continued)

(52) U.S. Cl.
CPC .......... *B01F 7/00341* (2013.01); *B01F 7/001* (2013.01); *B01F 7/06* (2013.01);
(Continued)

(58) Field of Classification Search
CPC ........ F04D 29/34; F04D 29/388; F04D 29/36; Y10T 29/49321; Y10T 29/49327;
(Continued)

(56) References Cited

U.S. PATENT DOCUMENTS 1,620,974 A * 3/1927 Kienk .................... B22D 19/00
164/109
2,392,281 A * 1/1946 Allen ................... B23K 33/004
228/165

(Continued)

FOREIGN PATENT DOCUMENTS

CN 202315802 U 7/2012
DE 2702795 C2 5/1984
(Continued)

OTHER PUBLICATIONS

International Search Report in counterpart International Application No. PCT/EP2014/000491, mailed Jun. 11, 2014.
(Continued)

*Primary Examiner* — Tony G Soohoo
(74) *Attorney, Agent, or Firm* — Edell, Shapiro & Finnan, LLC

(57) ABSTRACT

A device and a method for adjusting stirring blades on a stirring blade receptacle of a stirrer, wherein the stirring blades can be fixed with a stirring blade axis in receiving bores, which are arranged transversely to an axis of rotation and are a part of the stirring blade receptacle, at intended predetermined angle of attack relative to a virtual plane that is arranged transversely to the axis of rotation of the stirrer. An associated device body is provided with a receiving element for receiving the stirring blade receptacle with unfixed stirring blades. A stop is arranged on the device body for each lower face, which faces the receiving element and is a part of the stirring blades, outside the respective stirring blade axis. Each respective stirring blade is then brought into
(Continued)

abutment against its associated stop, to place it into the predetermined angle of attack.

12 Claims, 4 Drawing Sheets

(51) Int. Cl.
    *B01F 15/00*     (2006.01)
    *F04D 29/34*     (2006.01)
    *F04D 29/36*     (2006.01)
    *F04D 29/38*     (2006.01)
    *B29L 31/08*     (2006.01)

(52) U.S. Cl.
    CPC ... *B01F 15/00675* (2013.01); *B29L 2031/087* (2013.01); *F04D 29/34* (2013.01); *F04D 29/36* (2013.01); *F04D 29/388* (2013.01); *Y10T 29/49321* (2015.01); *Y10T 29/49327* (2015.01)

(58) Field of Classification Search
    CPC ......... Y10T 29/49332; B29L 2031/087; B01F 15/00675; B01F 7/001; B01F 7/00341; B01F 7/06
    USPC .................................... 29/243, 418; 366/343
    See application file for complete search history.

(56) References Cited

U.S. PATENT DOCUMENTS

| | | | | |
|---|---|---|---|---|
| 2,525,267 | A * | 10/1950 | Muzzey et al. | G01B 5/205 29/889.6 |
| 3,332,500 | A * | 7/1967 | Bristol | F04D 29/34 415/217.1 |
| 3,388,749 | A * | 6/1968 | Woods | B29C 70/28 228/903 |
| 3,403,844 | A * | 10/1968 | Stoffer | F01D 5/282 156/173 |
| 5,951,162 | A | 9/1999 | Weetman et al. | |
| 5,997,253 | A | 12/1999 | Feehan | |
| 7,097,430 | B2 * | 8/2006 | Harris | B29C 45/14065 264/45.3 |
| 7,396,212 | B1 * | 7/2008 | Parker | F04D 25/088 416/223 R |
| 2004/0253111 | A1 * | 12/2004 | Harris | B29C 45/14065 416/204 R |
| 2007/0271785 | A1 * | 11/2007 | Bladon | B23H 1/04 29/889.23 |
| 2009/0187269 | A1 * | 7/2009 | Miki | B23C 3/30 700/176 |
| 2010/0158661 | A1 * | 6/2010 | Dawson | B23P 6/00 415/4.3 |

FOREIGN PATENT DOCUMENTS

| | | |
|---|---|---|
| DE | 4121635 A1 | 1/1993 |
| DE | 19711019 A1 | 9/1998 |
| DE | 19859511 A1 | 7/2000 |
| DE | 10260490 A1 | 7/2004 |
| DE | 102006053339 A1 | 5/2008 |
| GB | 634486 A | 3/1950 |

OTHER PUBLICATIONS

Sartorius Stedim Biotech, "Manual adjustment of 3-blade segment impeller to an angle of 30 degrees".

International Preliminary Report on Patentability and Written Opinion in counterpart International Application No. PCT/EP2014/000491, dated Oct. 13, 2015.

Office Action in corresponding German Application No. 10 2013 103 526.4, dated Mar. 1, 2014, along with an English translation.

Office Action in corresponding Chinese Application No. 201480019302.1, dated Apr. 21, 2016, along with an English translation.

* cited by examiner

DEVICE AND METHOD FOR ADJUSTING STIRRING BLADES

CROSS REFERENCE TO RELATED APPLICATIONS

This is a Continuation of International Application PCT/EP2014/000491, which has an international filing date of Feb. 25, 2014, and the disclosure of which is incorporated in its entirety into the present Continuation by reference. The following disclosure is also based on and claims the benefit of and priority under 35 U.S.C. §119(a) to German Patent Application No. DE 10 2013 103 526.4, filed Apr. 9, 2013, which is also incorporated in its entirety into the present Continuation by reference.

FIELD OF THE INVENTION

The invention relates to a device for adjusting stirring blades on a stirring blade receptacle of a stirrer, wherein the stirring blades can be fixed with a stirring blade axis in receiving bores, which are arranged transversely to an axis of rotation and which are a part of the stirring blade receptacle, at a predetermine angle of attack relative to a virtual plane that is arranged transversely to the axis of rotation of the stirrer.

Furthermore, the invention relates to a method for adjusting stirring blades, which are to be arranged on a stirring blade receptacle of a stirrer and which are fixed with a stirring blade axis in receiving bores, which are arranged transversely to an axis of rotation and which are a part of the stirring blade receptacle, at a predetermined angle of attack relative to a virtual plane that is arranged transversely to the axis of rotation.

BACKGROUND

In bioreactors, which have a stirrer, it is necessary to optimally design and precisely install the stirrer, which has a stirring element arranged on a stirrer shaft. One particular aspect during installation is the precise setting of the angle of inclination, i.e., the angle of attack of the stirring blades that are to be arranged on a stirring blade receptacle. Since, when stirring, the highest angular speed may be found at the stirring blades of the stirrer, the highest shear forces are also at the stirring blades. If the angles deviate, then the shear forces rise dramatically, a phenomenon that results in injury to the organisms that are to be cultivated. In particular, in the case of reusable bioreactors, it is always necessary to remove the stirring elements when cleaning and then to install them again on the stirrer shaft. The ensuing process of adjusting the angle of attack has been a difficult, time-consuming and cost-intensive process to date.

The data sheet of Sartorius Stedim Biotech GmbH "Manual adjustment of 3-blade segment impeller to an angle of 30°" discloses a method for adjusting stirring blades in a stirring blade receptacle. The first step in this method is to screw the stirring blade only slightly into a threaded bore of the stirring blade receptacle by hand with a screwdriver. Then the desired attack angle of the stirring blade is set with an angle encoder; and the stirring blade is aligned along the angle-indicating device in such a way that the stirring blade receptacle is aligned parallel to the angle encoder. Only then is the stirring blade screwed firmly into the desired position in the threaded bore. The procedure is repeated sequentially for the other stirring blades. When all of the stirring blades have been screwed into the stirring blade receptacle at the required angle, the last step is to check, by placing the completely assembled stirring blade receptacle with the stirring blades on a flat surface, whether the underside of the stirring blade receptacle is aligned parallel to the flat surface, as a result of which it is ensured that all of the stirring blades are aligned at the desired angle of attack relative to the stirring blade receptacle.

The drawback with this procedure is that the adjustment is relatively time-consuming and, therefore, cost-intensive. In addition, the adjustment is relatively inaccurate.

DE 10 2006 053 339 A1 discloses a stirring device for fermenters, where in this case the stirring blades can be connected to a stirring blade receptacle, which is secured on a stirring shaft or more specifically on an axis of rotation, with a releasable plug-in connection. The end of a stirring blade that faces the stirring blade receptacle has a plug-in pin, which can be secured in a plug-in pin receptacle of the stirring blade receptacle with a locating screw in such a way that the plug-in pin can be released. The angle of attack of the stirring blades with respect to the axis of rotation can be varied by loosening, rotating and securing again the plug-in pin in the plug-in pin receptacle. In this case an angle of 5 to 15°, which is enclosed between the stirring blade longitudinal axis and the horizontal plane perpendicular to the axis of the stirrer shaft, remains constant in each instance. The end of the plug-in pin may be provided with, for example, four locking elements, which engage with four complementary locking receptacles on the end face of the plug-in pin receptacle. In this embodiment four different attack angles of the blades can be realized with respect to the stirrer hub. As an alternative, the plug-in pin may have a polygonal structure and may engage with a plug-in pin receptacle with a complementary polygonal receiving channel. In this embodiment it is possible to realize as many different angles of attack as there are corners on the polygonal structure.

The drawback with this known device is that it is, in particular, relatively cost-intensive to manufacture the stirring blade receptacle.

DE 27 02 795 C2 discloses an attachment for an angle-adjustable mixing blade on a support arm, which is fastened to a shaft, with at least one screw and nut connection and with at least one screw hole in the mixing blade, wherein the screw hole axis lies in a plane perpendicular to the support arm axis. The support arm has at least one oblong hole, which extends in a plane perpendicular to the support arm axis, and, parallel to the axis of the oblong hole, detent grooves, with which detents of the mixing blade engage. The attack angle of the mixing blade is varied by loosening the screw and nut connection, then lifting the detents out of the detent grooves and adjusting the mixing blade by rotating the mixing blade on a rounded engagement face of the support arm, so that the threaded bolts of the screws slide within the oblong holes.

The drawback with this device known from the prior art is also that it is, in particular, relatively cost-intensive to manufacture the stirring blade receptacle.

Furthermore, DE 197 11 019 A1 discloses a stirrer with stirring blades having angles of attack that can be variably changed for the purpose of carrying out polymerization reactions. In this case there are two stirring blades, which are mounted on a hollow drive shaft with two arms that are encapsulated. The stirring blades exhibit angles of inclination that can be varied relative to each other and with respect to the stirring shaft via a stoppable control shaft, which is located in the interior of the hollow drive shaft. The control shaft is connected to both arms through a toothed gear.

An important drawback with this device is that the stirrer is designed, on the whole, to be relatively complex and relatively cost-intensive.

SUMMARY

Therefore, an object of the present invention is to simplify the adjustment of the stirring blades on the stirring blade receptacle of a stirrer with a high degree of accuracy and to make said adjustment more cost-effective, thereby improving the known devices and methods.

The above-noted object with respect to the device is achieved in that a device body is provided with a receiving element for receiving the stirring blade receptacle with unfixed stirring blades. A stop is arranged on the device body for each lower face, which faces the receiving element and is a part of the stirring blades, outside the respective stirring blade axis. This enables the respective stirring blade to be brought into abutment against the stop, when the stirring blade has reached its angle of attack.

Since the device for adjusting stirring blades has a device body that is not dedicated to and is not an integral part of the stirrer or the stirring blade receptacle, for example, a stirring hub, the device can be used in a "mobile" manner for adjusting the stirring blades on different stirring blade receptacles. The device body can be used for adjusting stirrers that are already known and have proven to be useful, i.e. for adjusting stirring blades on their stirring blade receptacles. The separate device body, which can be used repeatedly, makes it possible to reduce the cost despite the higher degree of adjustment accuracy.

According to a preferred embodiment of the invention, the receiving element of the device body is designed as a receiving pin, onto which the stirring blade receptacle, which is to be adjusted, can simply be placed.

According to another preferred embodiment of the invention, the stops, which are associated with the stirring blades, are designed as stop faces, which are inclined, according to the predetermined angle of attack, relative to a virtual plane, which is arranged transversely to the longitudinal axis of the receiving pin; and the lower faces of the stirring blades can be brought into resting abutment against the stop faces at least in subregions. That is, if the stop faces are inclined according to the predetermined angle of attack, then the lower faces of the stirring blades, which have been brought into resting abutment, have the same predetermined angle of attack. The result is an "automatic" adjustment without any complicated measurement processes or the associated inaccuracies of measurement.

According to an additional preferred embodiment of the invention, the stop faces are formed as exposed faces.

The exposed stop faces render the production and handling of the device, i.e. the device body, particularly easy. The stirring blade receptacle with the unfixed stirring blades must only be pushed onto the receiving pin, so that the lower faces of the stirring blades are brought into resting abutment against the stop faces.

After the stirring blades have been secured in position, the stirring blade receptacle can be easily removed with the fixed stirring blades. In order to adjust the stirring blades at different angles of attack, it is possible to simply use another suitable device.

However, it is also possible for the device to have, in addition to the stop faces, which are designed as exposed faces, additional stop faces, which are inclined at a second predetermined angle of attack. Then a device for the adjustment of two different angles of attack can be used.

According to another preferred embodiment of the invention, the stop faces are designed as the faces of a recess for the partial accommodation of the stirring blades. The configuration of stop faces as the faces of a recess lends itself particularly well, when a device should be suitable for adjusting two or more angles of attack. As a result, first stop faces of a first recess would be used for adjusting a first angle of attack; and second stop faces of a second recess would be used for adjusting a second angle of attack. In particular, it is also possible to design the first stop faces for adjusting a first angle of attack as the exposed stop faces and the second stop faces for adjusting a second angle of attack as the stop faces of a recess.

The object with respect to the method is achieved by carrying out the following process:

a) inserting the stirring blades with the free ends of their stirring blade axes into the receiving bores of an associated stirring blade receptacle, b) placing the stirring blade receptacle onto a receiving element of a device body of a stirring blade adjusting device, c) positioning the stirring blade receptacle by bringing the lower faces of the stirring blades into abutment at the intended angle of attack against a corresponding stop of the device body, d) securing the stirring blades in the stirring blade receptacle, and e) removing the stirring blade receptacle from the device.

The stirring blades are inserted in the conventional manner with the free ends of their stirring blade axes into the receiving bores of the stirring blade receptacle. Next, the stirring blade receptacle is simply pushed onto a receiving element of a device body of a device configured to adjust the stirring blades, so that, thereafter, the stirring blades are adjusted almost automatically to their intended attack angle by bringing their lower faces into abutment against a corresponding stop of the device body. Then the stirring blades of the stirring blade receptacle are attached in the well-known manner by fixing their stirring blade axes; and the stirring blade receptacle with the stirring blades, fixed therein, is simply removed from the device.

According to a preferred embodiment of the invention, the lower faces of the stirring blades are positioned by bringing them into flat abutment against the stops that are designed as exposed stop faces. As a result, the stirring blade receptacle can be easily removed from the device.

According to another preferred embodiment of the invention, the ends of the stirring blades that face the device body are inserted into corresponding recesses of the device body; and the stirring blades are positioned by bringing their lower faces into flat abutment against the stop faces that are formed by the recesses.

If the ends of the stirring blades are inserted into corresponding recesses of the device body, then the stirring blade receptacle is removed from the device with a helical rotary motion.

BRIEF DESCRIPTION OF THE DRAWINGS

Additional details of the invention will become apparent from the following detailed description and the accompanying drawings, in which some advantageous embodiments of the invention are illustrated by way of example.

DETAILED DESCRIPTION

Figure 1:
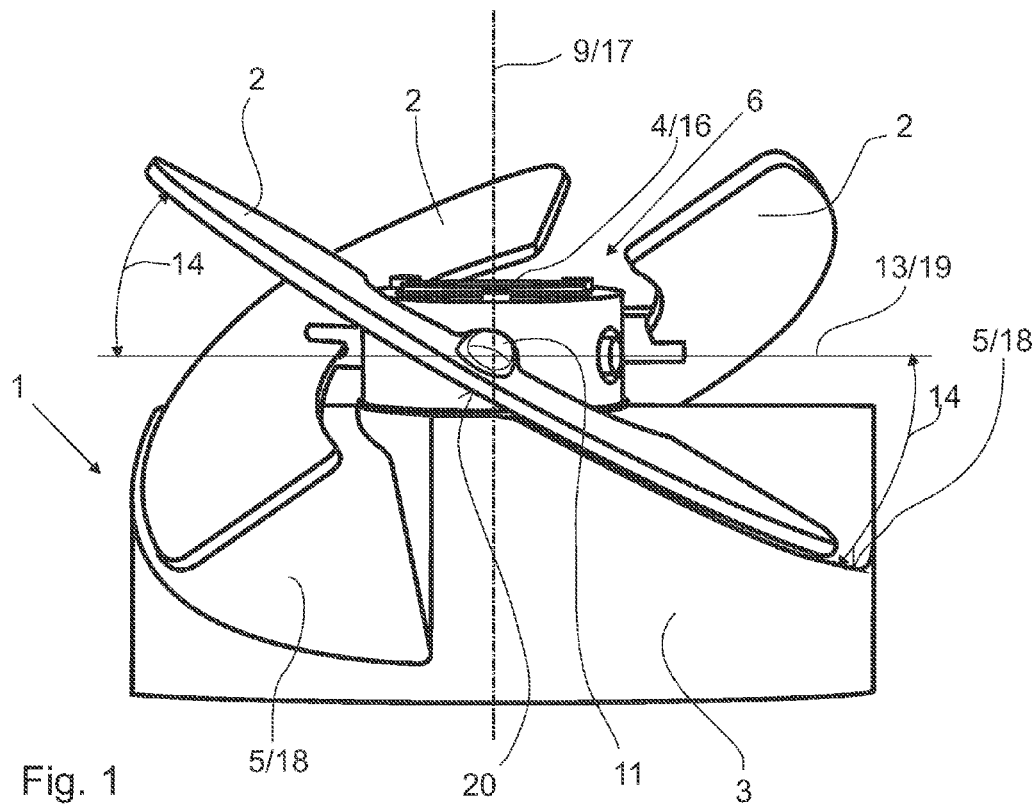
FIG. 1: a side view of a device for adjusting stirring blades with the attached stirring blade receptacle of a stirrer with the stirring blades attached at the intended angle of attack.
Figure 2:
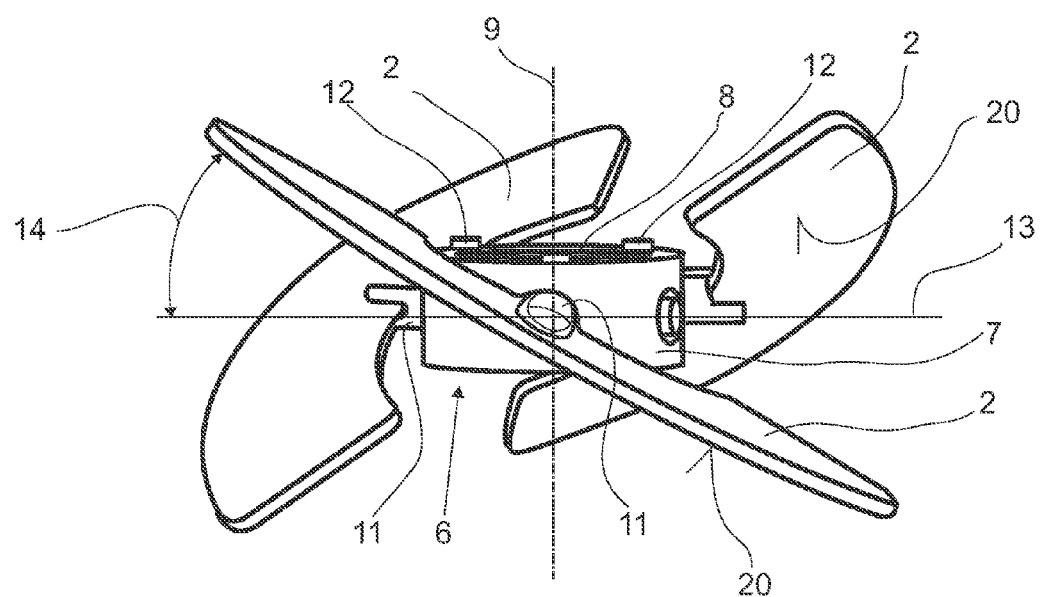
FIG. 2: a side view of the stirring blade receptacle from FIG. 1.
Figure 3:
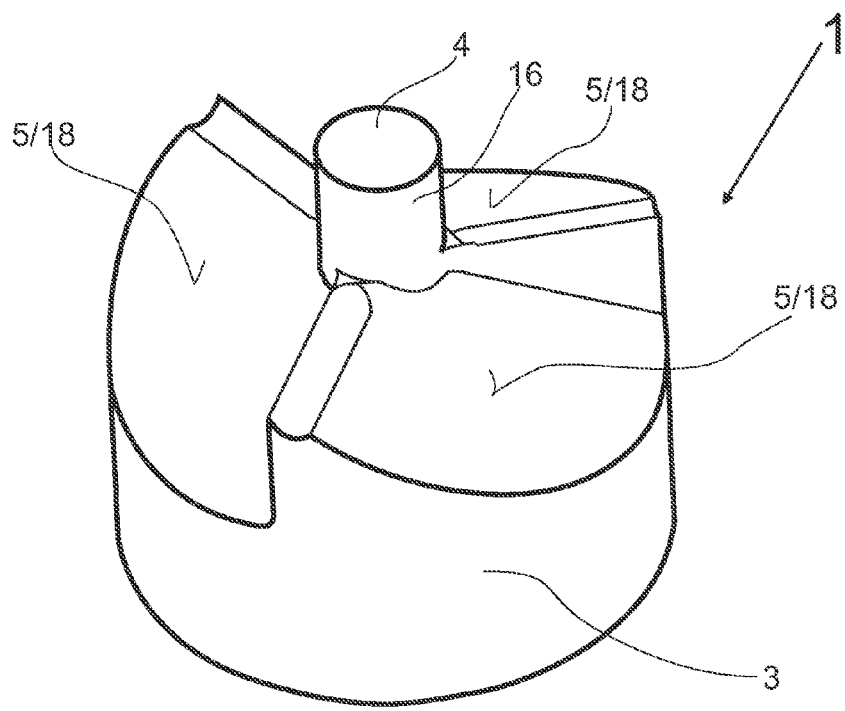
FIG. 3: a three-dimensional representation of a device for adjusting stirring blades with exposed stop faces.
Figure 4:
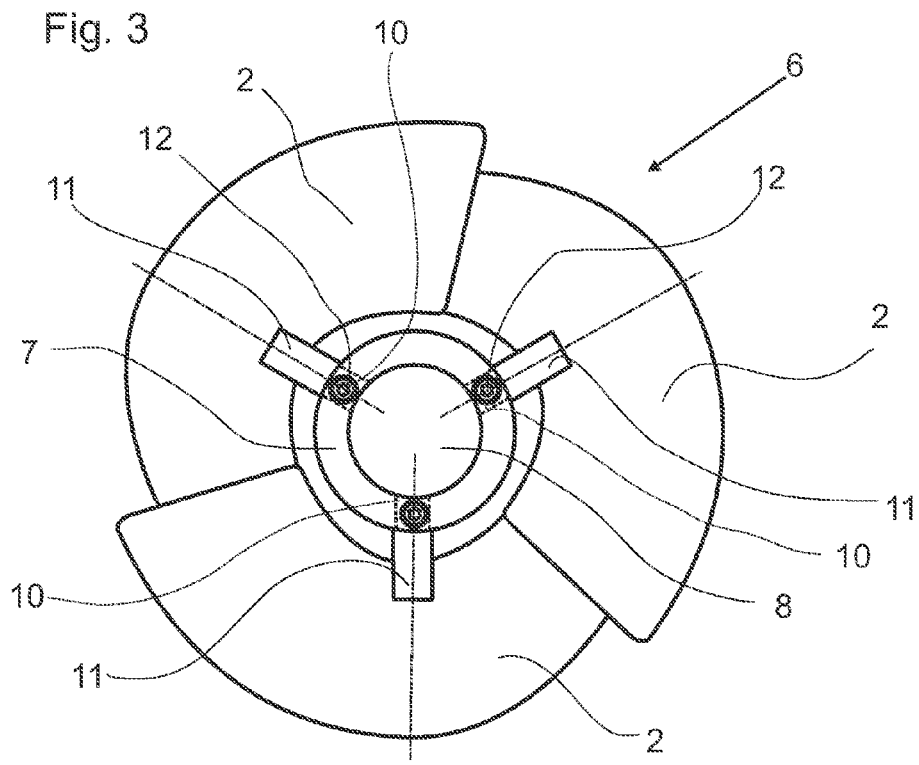
FIG. 4: a plan view of the stirring blade receptacle from FIG. 2.

A device 1 for adjusting stirring blades 2 consists primarily of a device body 3 with a receiving element 4 and stops 5. A stirring blade receptacle 6 for receiving the stirring blades 2 consists, as well known, of a ring-shaped element 7 with a central opening 8 for mounting on an axis of rotation 9 (shown only as an axis of symmetry) of a stirrer. Transversely to the axis of rotation 9, the ring-shaped element 7 has radial bores 10 for receiving a free end of the stirring blade axis 11, which is connected to the stirring blade 2. The stirring blades 2 can be secured with their stirring blade axes 11 in the radial receiving bores 10 of the element 7 using locating screws 12.

The stirring blades 2 are adjusted to a predetermined first angle of attack 14 or a second angle of attack 15 relative to a virtual plane 13. The virtual plane 13 is arranged transversely to the axis of rotation 9 of the stirrer.

According to the embodiments that are shown only for illustrative purposes, each of the device bodies 3 has, as a receiving element 4, in each instance a receiving pin 16, onto which the ring-shaped element 7 of the stirring blade receptacle 6 can be positioned via its central opening 8.

The receiving pin 16 has a longitudinal axis 17, which coincides with the axis of rotation 9 of the stirring blade receptacle 6 when the stirring blade receptacle 6 is attached.

According to the exemplary embodiments in FIGS. 1, 3 and 5 to 7, the device bodies 3, 3' have stops 5 that are designed as exposed stop faces 18, 18'. The exposed stop faces 18, 18' are inclined, according to the predetermined first angle of attack 14, relative to a virtual plane 19, which is arranged transversely to the longitudinal axis 17. The stirring blades 2 are thereby brought with their lower face 20 into resting abutment in the region of the stop faces 18, 18' and, as a result, are inclined at the angle of attack 14, after the stirring blade receptacle 6 has been pushed with the unfixed stirring blades 2, i.e. with the stirring blades that have been inserted only loosely into the radial receiving bores 10 without being secured in position e.g. by screws, onto the receiving element 4. After the stirring blades 2 have been positioned at the desired angle of attack 14, these stirring blades are fixed at the specified angle of attack 14 by manually fastening them using screws in the radial receiving bores 10.

Figure 5:
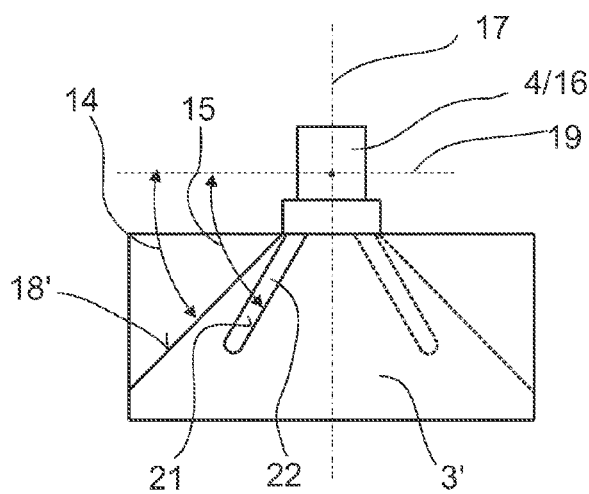
FIG. 5: a side view of another device for adjusting stirring blades with exposed stop faces inclined at a first attack angle and recesses having stop faces that are inclined at a second angle of attack.
Figures 6, 7:
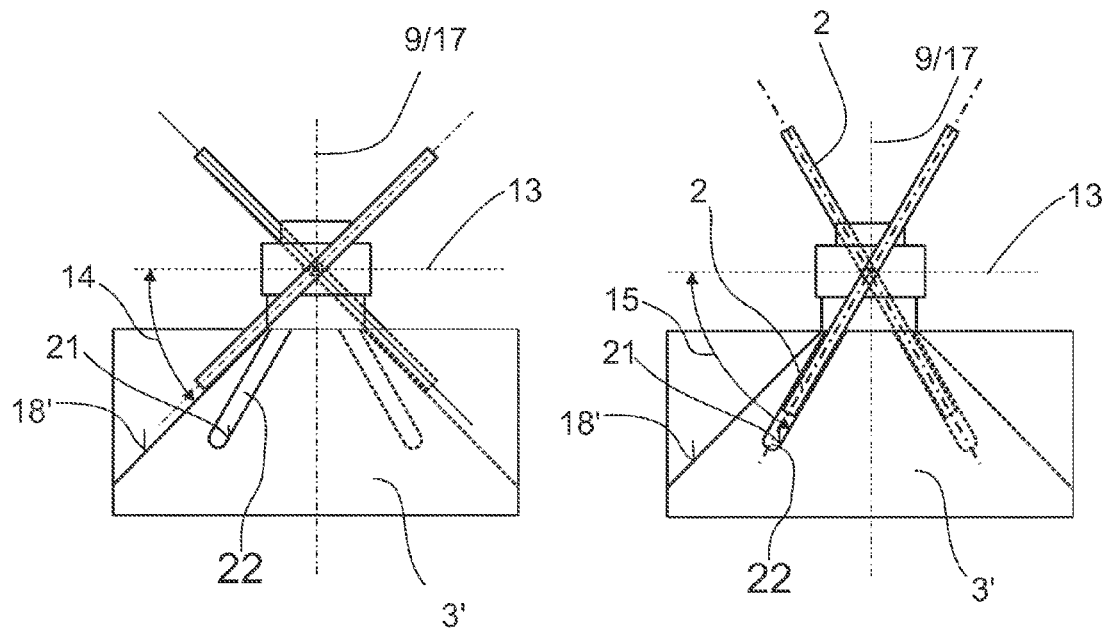
FIG. 6: a side view of the device from FIG. 5 with attached stirring blade receptacle and stirring blades, which are inclined at a first angle of attack.
FIG. 7: a side view of the device for adjusting stirring blades from FIG. 5 with attached stirring blade receptacle and stirring blades, which are inclined at a second angle of attack and engage with the recesses of the device.

According to the exemplary embodiments in FIGS. 5 to 7, there are, in addition to the first stop faces 18', second stop faces 21, as a part of the recesses 22, which are inclined at the second predetermined angle of attack 15 relative to the virtual plane 19.

Figure 8:
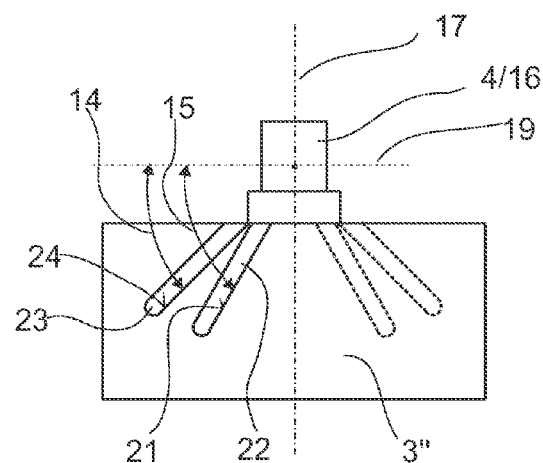
FIG. 8: a side view of another device for adjusting stirring blades with recesses having stop faces which are inclined at a first angle of attack, and recesses having stop faces which are inclined at a second angle of attack.
Figures 9, 10:
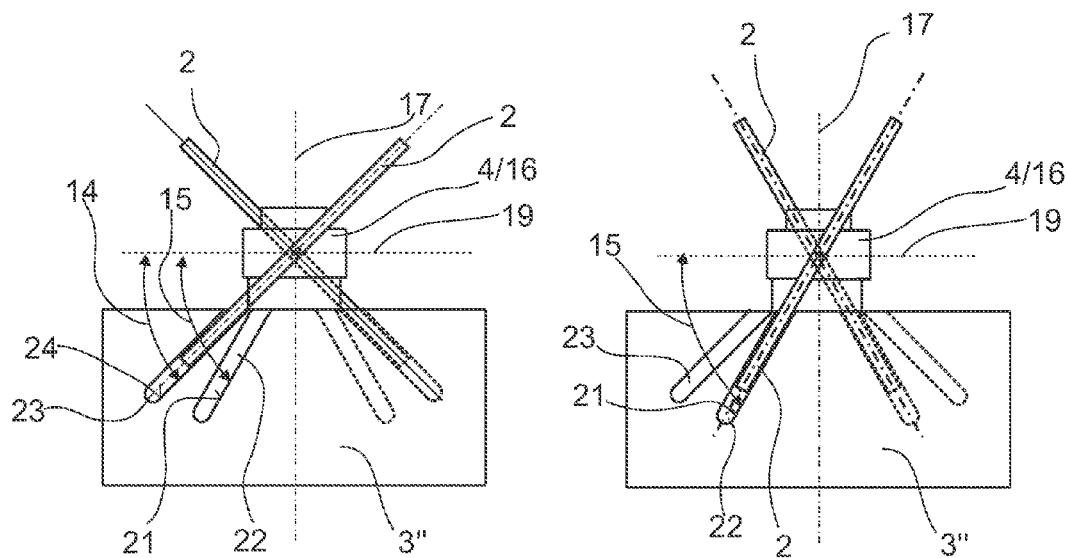
FIG. 9: a side view of the device for adjusting stirring blades from FIG. 8 with attached stirring blade receptacle and stirring blades, which are inclined at a first angle of attack.
FIG. 10: a side view of the device for adjusting stirring blades from FIG. 8 with attached stirring blade receptacle and stirring blades, which are inclined at a second angle of attack and which engage with the second recesses.

According to the exemplary embodiments from FIGS. 8 to 10, the device body 3" has, in addition to the recesses 22, a recess 23 with first stop faces 24, which are inclined at the first predetermined angle of attack 14 relative to the virtual plane 19.

In the exemplary embodiments the first angles of attack 14 are 30°, while the second angles of attack 15 are 45°.

The embodiments that are discussed in the detailed description and shown in the figures are merely embodiments of the present invention that are shown for illustrative purposes. The person skilled in the art is given a wide range of possible variations in light of the disclosure herein. In particular, the stops 5 do not have to be designed to be necessarily flat. They can also be designed, for example, as the ends of setscrews. For example, more than two recesses 22, 23 can also be provided. It is even possible to use different stirring blade receptacles 6, so that said stirring blade receptacles can have, in addition to two and three stirring blades 2, also four or five stirring blades 2 and more.

LIST OF REFERENCE NUMERALS 1 device
2 stirring blade
3, 3', 3" device body
4 receiving element
5 stop
6 stirring blade receptacle
7 ring-shaped element of 6
8 central opening of 7
9 axis of rotation
10 radial receiving bore of 7
11 stirring blade axis
12 locating screw
13 virtual plane
14 first angle of attack
15 second angle of attack
16 receiving pin of 4
17 longitudinal axis of 16
18, 18' (exposed) stop face of 5
19 virtual plane of 3, 3', 3"
20 lower face of 2
21 second stop face of 22
22 recess
23 recess
24 first stop face of 23

What is claimed is:

1. Device for adjusting stirring blades on a stirring blade receptacle of a stirrer, wherein the stirring blades are configured to be fixed along respective stirring blade axes in respective receiving bores of the stirring blade receptacle, which bores are arranged transversely to an axis of rotation of the stirrer at a predetermined angle of attack relative to a virtual plane that is arranged transversely to the axis of rotation of the stirrer, comprising:

a device body provided with a receiving element configured to receive the stirring blade receptacle with unfixed stirring blades which each have a respective lower face, and a plurality of stops arranged on the device body respectively for each of the lower faces that face the receiving element, outside the respective stirring blade axes, such that each of the respective stirring blades lies in abutment against a respective one of the stops when the respective stirring blade is positioned in the predetermined angle of attack.

2. The device as claimed in claim 1, wherein the receiving element is configured as a receiving pin structured to receive the stirring blade receptacle.

3. The device as claimed in claim 2, wherein the respective stops are configured as stop faces each of which are inclined in accordance with the predetermined angle of attack, relative to a virtual plane, which is arranged transversely to a longitudinal axis of the receiving pin, and each of the lower faces of the stirring blades lies in resting abutment against a respective one of the stop faces at least in subregions of the stop faces.

4. The device as claimed in claim 3, wherein the stop faces are configured as exposed faces.

5. The device as claimed in claim 3, wherein the stop faces are configured as faces of a recess respectively partly accommodating each of the stirring blades.

6. The device as claimed in claim 3, wherein the stop faces comprise first stop faces that accommodate a first angle of attack and second stop faces that accommodate a second angle of attack.

7. Method for adjusting stirring blades (i) which are arranged on a stirring blade receptacle of a stirrer, (ii) which extend along respective stirring blade axes in respective receiving bores of the stirring blade receptacle which extend transversely to an axis of rotation of the stirrer, and (iii) which define respective angles of attack relative to a virtual plane that is arranged transversely to the axis of rotation, comprising:

a) inserting free ends of the stirring blades respectively into the receiving bores of the stirring blade receptacle, b) placing the stirring blade receptacle onto a receiving element of a device body of a stirring blade adjusting device, c) positioning the stirring blade receptacle by bringing lower faces of the stirring blades into abutment at predetermined angles of attack against respective stops of the device body, d) fixing the stirring blades in the stirring blade receptacle, and e) removing the stirring blade receptacle from the device.

8. The method as claimed in claim 7, wherein said positioning comprises bringing the lower faces of the stirring blades into flat abutment against exposed stop faces of the stops.

9. The method as claimed in claim 8, wherein said removing comprises withdrawing the stirring blade receptacle from the receiving element of the device body.

10. The method as claimed in claim 7, wherein said inserting comprises inserting the free ends of the stirring blades that face the device body into respective recesses of the device body, and said positioning comprises positioning the stirring blades by bringing the lower faces into flat abutment against respective stop faces formed by the recesses.

11. The method as claimed in claim 10, wherein said removing comprises removing the stirring blade receptacle from the device with a helical rotary motion.

12. A system comprising:

a stirrer comprising a stirring blade receptacle and a plurality of stirring blades, wherein the stirring blades extend along respective stirring blade axes from respective receiving bores of the stirring blade receptacle, which are arranged transversely to an axis of rotation of the stirrer, and wherein the stirring blades are each selectively rotatable around the respective stirring blade axes or fixed at respective, predetermined angles of attack relative to a virtual plane that is arranged transversely to the axis of rotation of the stirrer, and a device comprising a device body including a receiving element configured to receive the stirring blade receptacle and a plurality of stops arranged on the device body and respectively defining the respective angles of attack, wherein, when the stirring blade receptacle is received by the receiving element and the stirring blades are rotated to lie in abutment against respective ones of the stops, the stirring blades assume and are configured to be fixed in the respective angles of attack.

* * * * *